July 31, 1956

C. E. KERR 2,756,916

MACHINE FOR DISPENSING FLUIDS

Filed Nov. 22, 1950

Inventor
CHARLES E. KERR

By Hans G. Hoffmeister.

Attorney

July 31, 1956

C. E. KERR

2,756,916

MACHINE FOR DISPENSING FLUIDS

Filed Nov. 22, 1950

Inventor
CHARLES E. KERR

By Hans G. Hoffmeister
Attorney

FIG_13

July 31, 1956   C. E. KERR   2,756,916
MACHINE FOR DISPENSING FLUIDS
Filed Nov. 22, 1950   10 Sheets-Sheet 10

Inventor
CHARLES E. KERR
By Hans G. Hoffmeister
Attorney

United States Patent Office 2,756,916
Patented July 31, 1956

2,756,916

MACHINE FOR DISPENSING FLUIDS

Charles E. Kerr, Hoopeston, Ill., assignor to Food Machinery and Chemical Corporation, San Jose, Calif., a corporation of Delaware Application November 22, 1950, Serial No. 197,097

21 Claims. (Cl. 226—97)

This invention relates to machines for filling fluids into containers. More particularly the invention relates to machines adapted to fill measured quantities of a fluid into containers. Machines of this type are commonly employed in the food preservation industry to fill measured quantities of brine or syrup into every one of an endless procession of cans.

It is an object of the invention to provide a machine, of the type referred to, that combines simplicity of construction with dependability of operation such that it will dispense very precisely the desired quantity of fluid into each can.

Another object is to provide a machine, of the type referred to, wherein the quantity of fluid dispensed into each individual container may conveniently be adjusted within wide limits.

Moreover it is an object to provide a machine, of the type referred to, wherein adjustments in the quantity of the dispensed fluid may be performed while the machine is in operation.

Furthermore, it is an object to provide a can filling machine, of the type referred to, containing a multiplicity of fluid dispensing units wherein the quantity of fluid dispensed may simultaneously be varied for all of said units by a single adjustment which may be performed without the necessity of bringing the machine to a standstill.

Still another object is to provide a multiple unit container filling machine of the continuous motion type, wherein the individual can filling units are adapted to discharge their measured contents of fluid only in the presence of cans of the reception of said liquid.

Another object is to provide a machine, of the type referred to, that may readily be adjusted to handle containers of different height without need to interrupt the operation of the machine.

Additionally, it is an object of the invention to provide a container filling machine of the type referred to that is easy to clean.

These and other objects of my invention will be apparent from the following description of the accompanying drawings which illustrate a preferred embodiment thereof and wherein.

Figure 1:
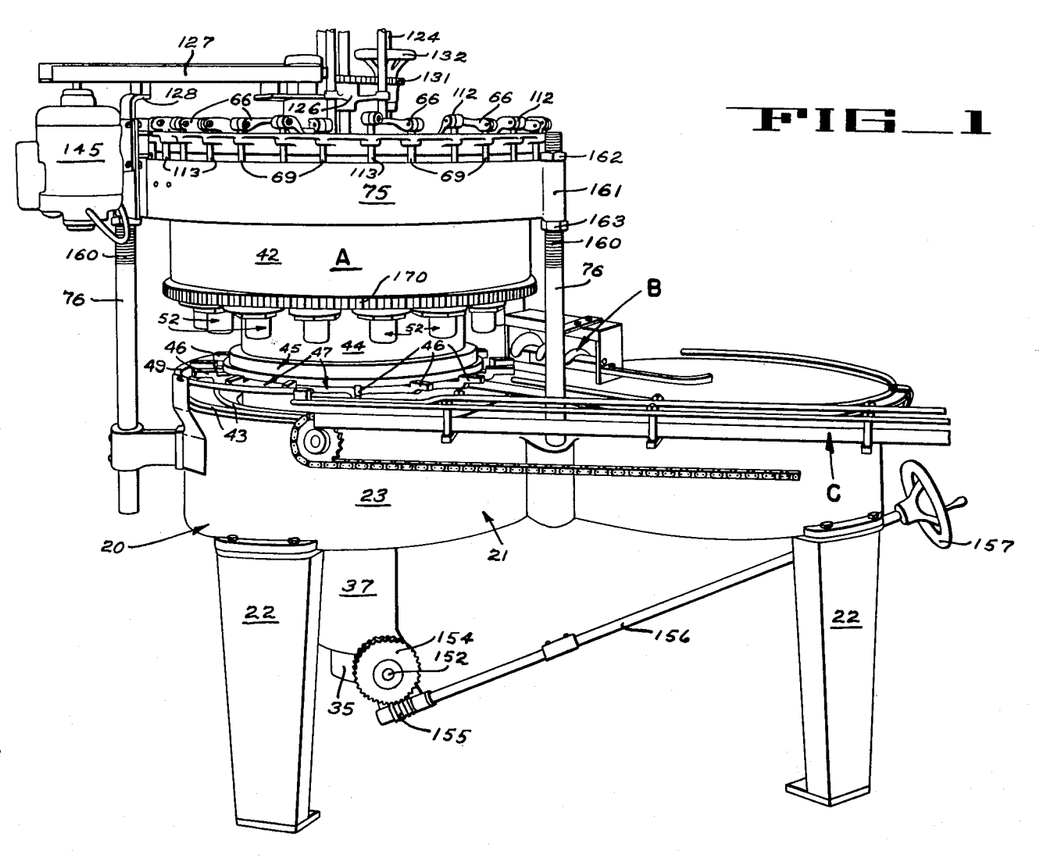
Fig. 1 is a perspective of a machine for filling measured quantities of a liquid into containers, constructed in accordance with the invention.
Figure 2:
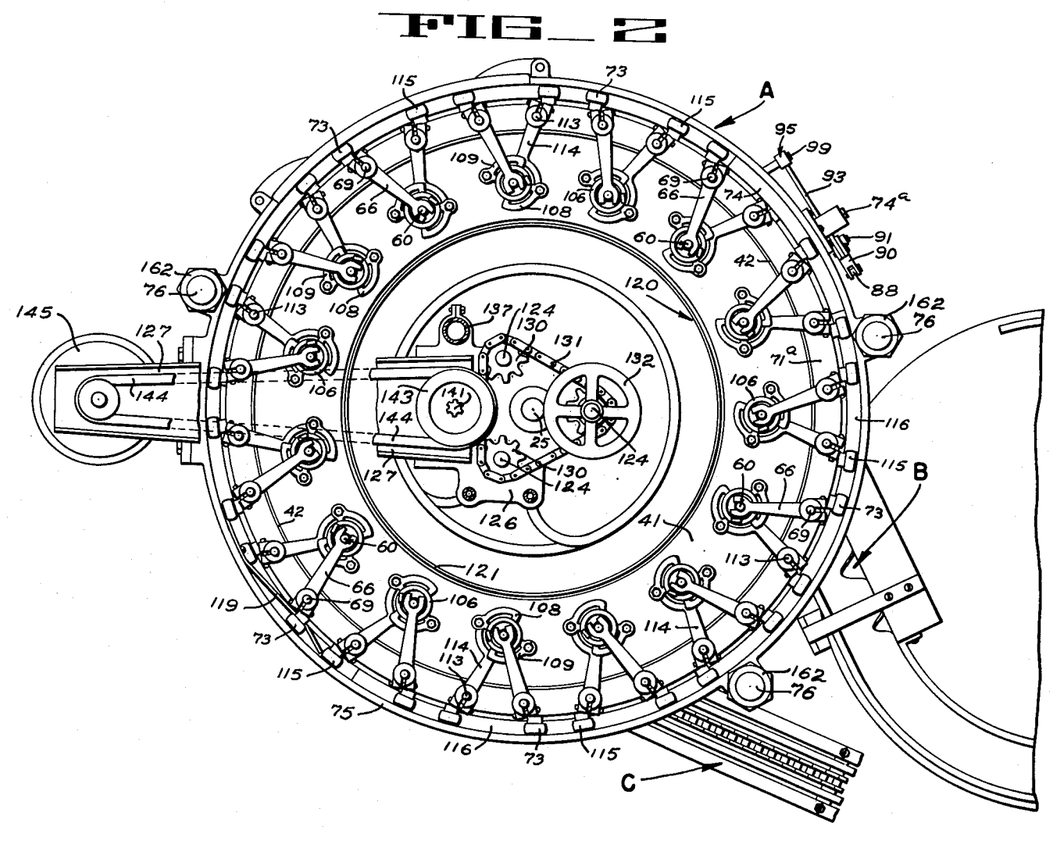
Fig. 2 is a plan view of the machine illustrated in Fig. 1 with parts of its superstructure omitted to expose the mechanism underneath.

The machine illustrated in Figs. 1 and 2 comprises a rotary can filling station A to which cans are delivered in timed relation by a suitable can feeding mechanism, such as the worm feed B, and which discharges the filled cans into suitable conveying means, such as the discharge chute C.

Figure 3:
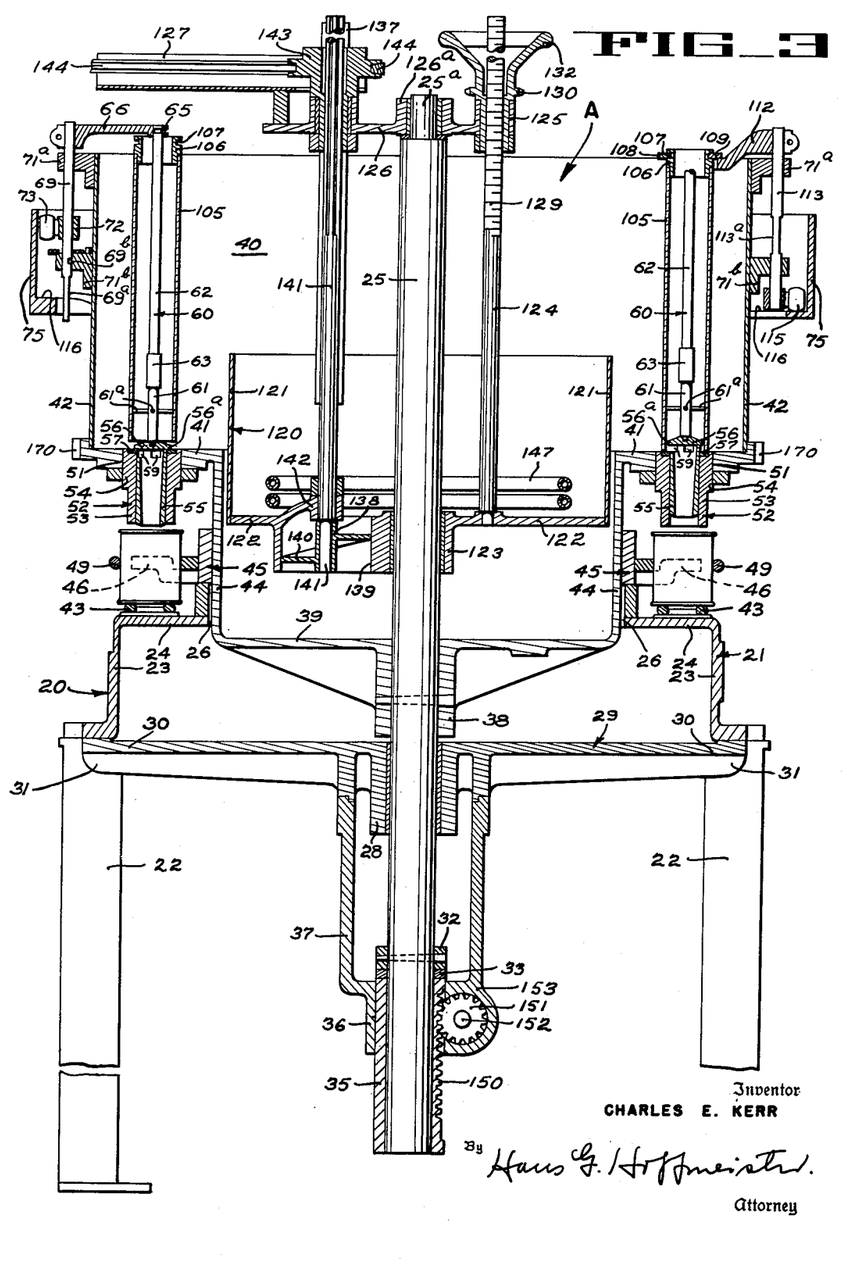
Fig. 3 is a vertical section through the same machine along its center axis.

Having reference to Fig. 3 the rotary filling station A comprises a stationary pedestal 20 formed by an annular casting 21 which rests upon a plurality of vertical legs 22 (only two of which are visible in Fig. 3). The annular casting 21 has a cylindrical side wall 23 the upper edge of which is turned inwardly to form a horizontal flange 24. The main shaft 25 of the filling station extends vertically through the center opening 26 of the casting 21 as formed by its annular flange 24 and is received for both, vertically sliding, as well as rotary movement, within a bearing 28 that forms the hub of a spider 29 which rests with the tips of its arms 30 in suitable recesses 31 of the above mentioned vertical legs 22. A collar 32 is pinned to the shaft 25 near the lower end thereof and said collar rests upon a gasket or washer 33 placed upon the upper end of a vertically positioned sleeve 35 that surrounds the lower end of the shaft 25. Said sleeve is slidably received within a bearing 36 formed in a frame structure 37 which is supported from the aforementioned arms 30 of the spider 29. Within the bearing 36 said sleeve 35 is held by means to be described hereinafter which permit variation of its vertical position for the purpose of adjusting the vertical position of the main shaft 25.

In upward direction the main shaft 26 extends through, and is pinned to, a bearing 38 formed in the cup-shaped bottom 39 of a tank or reservoir 40 which surrounds said shaft concentrically and is itself concentrically disposed within the center aperture 26 of the hereinbefore described annular casting 21. The upper edge of the cup-shaped tank bottom 39 is turned outwardly to form a horizontal annular flange 41 that extends a distance above the horizontal flange 24 of the annular casting 21 and which supports along its periphery the cylindrical side wall 42 of the tank 40.

Secured to the flange 24 of the annular casting 21 is a track 43 to support the cans delivered thereto by the can feed mechanism B, and secured to the vertical portion 44 of the cup-shaped tank bottom below the outwardly turned flange 41 thereof is a can propelling turret 45. Said turret possesses an endless sequence of circumferentially spaced radially directed propeller fingers 46 which form an endless sequence of pockets 47. Within said pockets 47 the cans are received and are propelled by the fingers 46 along the track 43 as the tank 40 rotates about its center axis. An arcuate guide rail 49 (Figures 1 and 13) accompanies the track 43 along its outer perimeter so as to hold the cans to their circular course as the fingers 46 of the turret 45 propel them around the machine.

Figure 4:
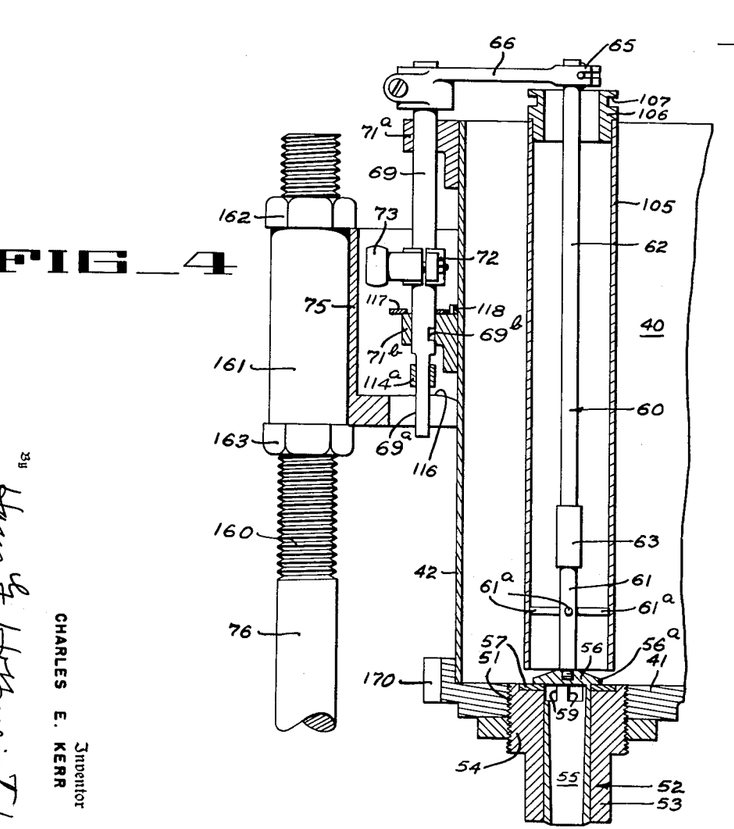
Figs. 4 and 5 are fragmentary detail views showing parts of the vertical section illustrated in Figure 3 on an enlarged scale.
Figure 6:
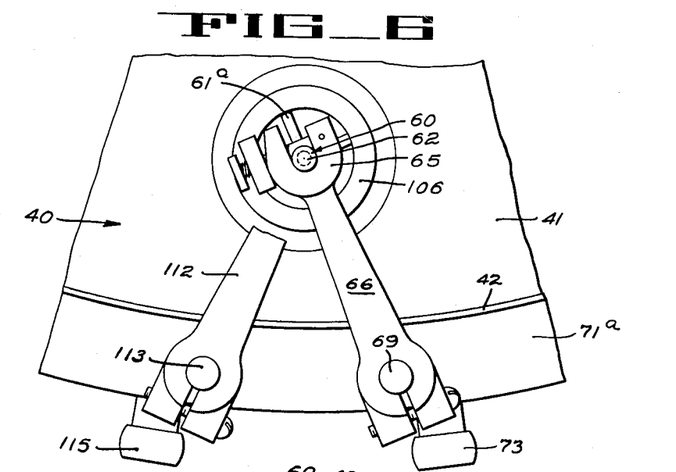
Fig. 6 is a fragmentary plan view illustrating details of the actuating mechanism for the filler valves comprised in the machine of the invention.
Figure 7:
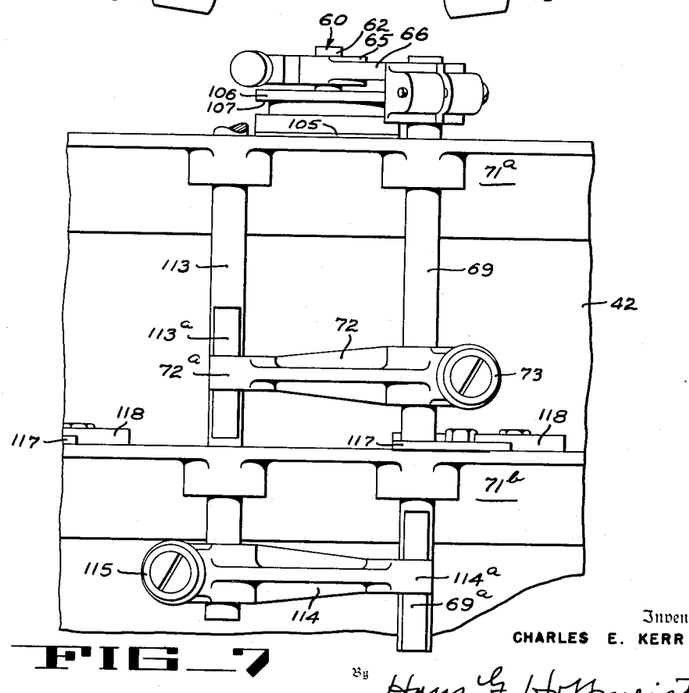
Fig. 7 is a fragmentary elevational view showing the mechanism illustrated in Figure 6 as viewed from the periphery of the machine.
Figure 11:
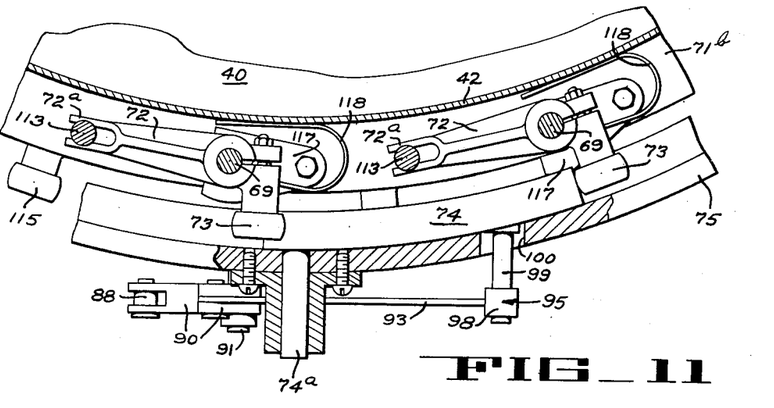
Fig. 11 is a fragmentary plan view, partly in section, which illustrates the cam track that operates the actuating mechanisms for the filler valves.
Figure 12:
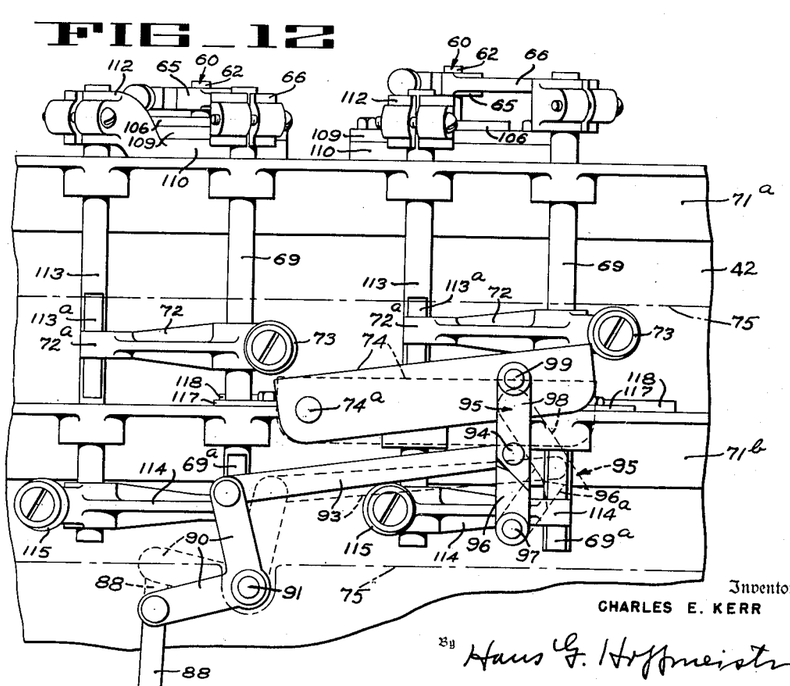
Fig. 12 is a fragmentary elevational view of the cam track shown in Figure 11 and of part of the control mechanism for said cam track as viewed from the periphery of the machine.
Figure 13:
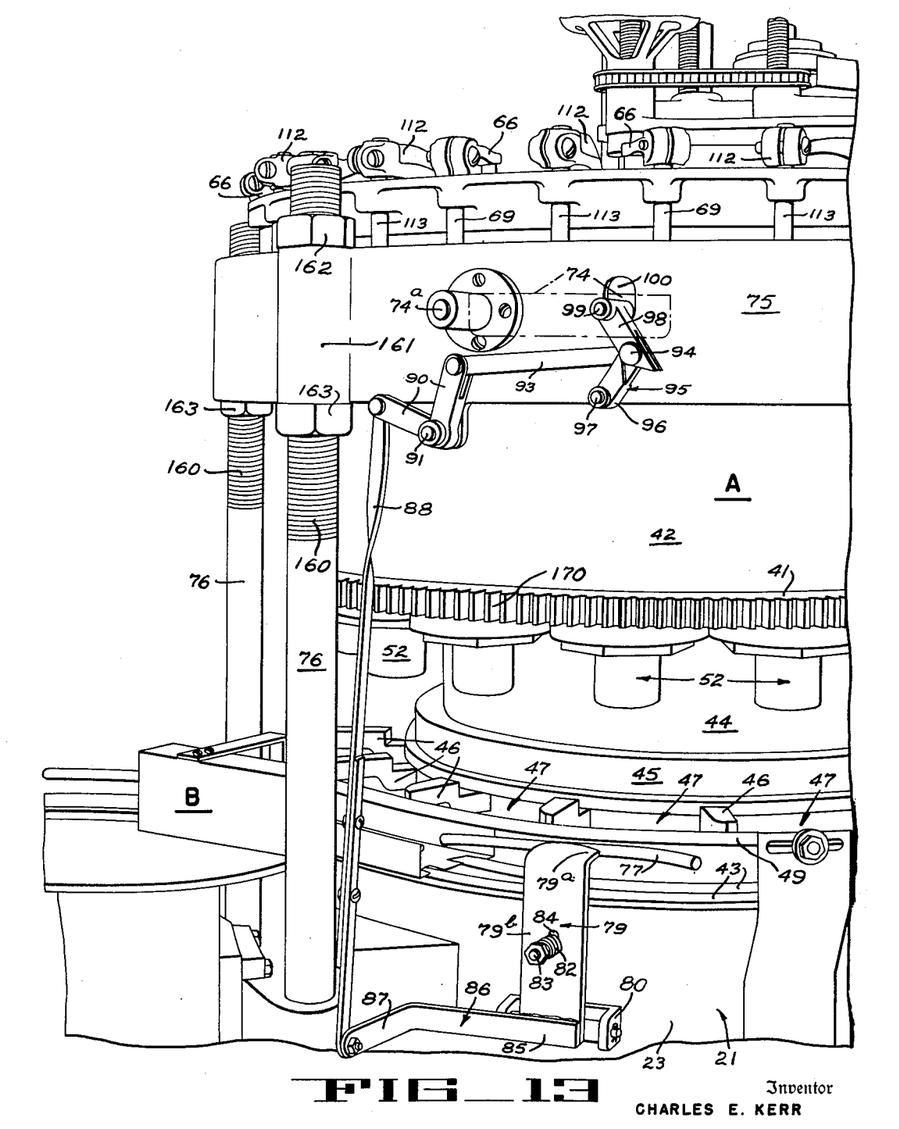
Fig. 13 is a fragmentary perspective of the machine which illustrates the total control mechanism for the cam track shown in Figures 11 and 12.
Figure 15:
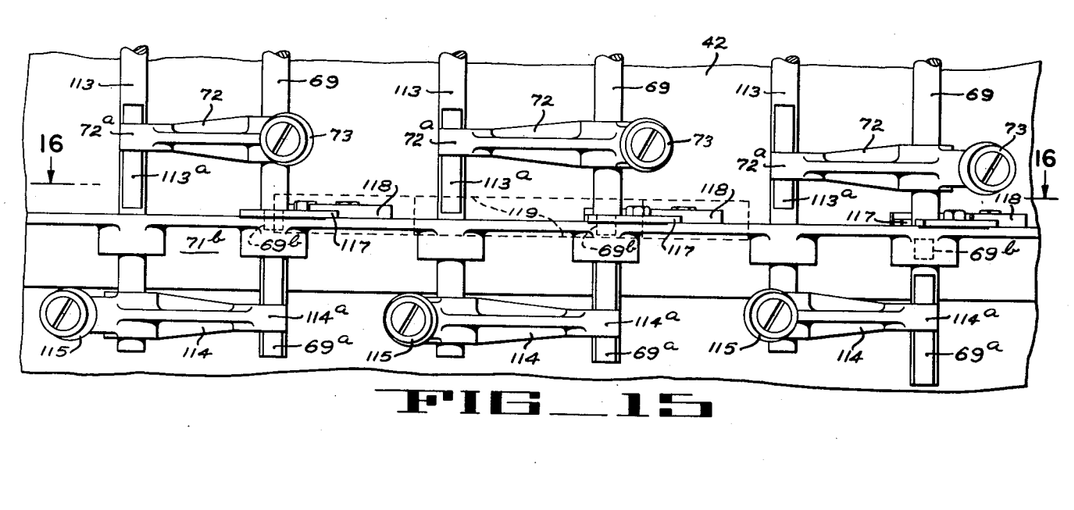
Fig. 15 is a fragmentary elevational view, similar to Figure 7, illustrating further details of the actuating mechanisms for the filler valves.

Provided in the horizontal flange 41 of the cup-shaped tank bottom 39 in vertical alignment with the can propelling pockets 47 are circular openings 51 within which are seated the can filling valves 52 that discharge the liquid contained in the reservoir 40 into the containers traveling underneath. Having reference to Figures 4 and 5, each of said valves comprises a bushing 53 having a threaded upper end 54 which engages the threaded side wall of the circular opening 51, and slidably received within the cylindrical interior of each bushing 53 is a valve nozzle 55 the tubular interior of which is preferably arranged to converge in downward direction, as shown. The upper end of the tubular valve nozzle 55 is closed by a lid member 56 that forms a radially projecting rim 56a which is adapted to rest loosely upon a circular gasket 57 that is seated in a countersunk depression in the top surface of the valve bushing 53. Directly below said lid 56 a plurality of ports 59 are provided in the side wall of the tubular valve nozzle 55 along its circumference. Said ports are effectively closed by the bushing 53 as long as the valve nozzle remains in the position illustrated in Fig. 4 wherein the lid member 56 rests upon the gasket 57. Means are provided to lift the valve nozzle 55 at the appropriate time above the position illustrated in Figure 4 into the position illustrated in Figure 5 so as to permit liquid from from the reservoir 40 to reach the tubular interior of the nozzle through the port 59 and discharge from the tapering lower end thereof into a can traveling underneath. For this purpose, the lid member 56 of each valve 52 is suitably secured to the lower end of a stem 60 which may be composed of two vertically aligned stem sections 61 and 62 that are joined by a suitable coupling 63, as shown. Said stem 60 extends above the upper edge of the reservoir 40 and its upper end is embraced by and clamped into the bifurcated end 65 of an arm 66 as shown in Figure 6. The arm 66 extends radially beyond the wall 42 of the reservoir 40 and its outer end is suitably clamped to a vertically positioned rod or bar 69 that is slidably received in vertically aligned apertures provided in two vertically spaced rings 71a and 71b fastened to the tank wall 42 at the outer surface thereof, as shown in Figures 7 and 15. Clamped to said rod 69 at a point intermediate of said rings is an arm 72 disposed tangentially of the reservoir 40, and pivoted to said arm is a cam follower roller 73 that is adapted to engage a cam track segment 74 (Figures 10, 11 and 12) during rotation of the reservoir. Said cam track segment 74 is pivotally supported by a stud 74a from the inner face of a stationary annular band 75 in angular alignment with the sector of the can track 43 of the machine where the cans are to be filled with liquid from the reservoir. Said band 75 surrounds concentrically the side wall 42 of the reservoir (Figure 1) and is adjustably supported from the stationary pedestal 20 of the machine by means of two posts 76 located at diametrically opposite points of the machine (Figures 1 and 13). In order that liquid from the reservoir may be discharged through a valve 55 only when a can is positioned underneath and traveling in alignment with said valve, the cam track segment 74 is normally held in a lowered position, as illustrated in broken lines in Figures 12 and 13, wherein it remains without effect upon the cam follower rollers 73 that rotate with the reservoir 40 about the vertical main axis of the machine. However, whenever a can is contained in the turret pocket 47 corresponding to a roller 73 passing above the track segment 74, said segment is automatically lifted into the position, shown in full lines in said Figure 12, in which it engages and elevates said roller 73 so as to lift the valve nozzle 55 controlled thereby. For this purpose a feeler element in the form of a horizontally positioned arcuate rod 77 protrudes with its convex side at a point in angular alignment with the cam track segment 74 from the outside into the circular path of the cans as defined by the guide rail 49 as shown in Figure 13. Said rod 77 is secured to the short horizontal bar 79a of an arm 79 in the form of an inverted L, which has a vertical bar 79b whose lower end is hinged to the cylindrical side wall 23 of the stationary casting 21 as shown at 80 in Figure 14. A spring 82 coiled around a stud 83 that extends through a slot 84 in the vertical bar 79b of the arm 79 urges said arm against suitable stop means (not shown), provided on the cylindrical side wall of the casting 21, so as to project the arcuate feeler rod 77 yieldably into the path of the cans. Rigidly secured to the lower end of said L-shaped arm 79 is the long bar 85 of an L-shaped link 86 that lies in a horizontal plane, with said long bar 85 disposed tangentially of the annular casting 21. The radially projecting short bar 87 of said link 86 is pivotally connected to the lower end of a vertical link 88 that may be of adjustable length. The upper end of said link 88 is pivoted to one arm of a bell crank 90 which turns on a stud 91 mounted in the hereinbefore described stationary band 75. The other arm of said bell crank is pivoted to one end of an actuating link 93 that is pivotally connected with its other end to the center point 94 of a toggle joint 95 (Figures 12 and 13). The lower link 96 of said toggle joint is pivoted to the band 75, as shown at 97, while its upper link 98 is pivotally connected to the free end of the cam track segment 74 by means of a pin 99 that protrudes through a suitable aperture 100 provided in the band 75. If there is no can in the turret pocket 47 that passes the feeler rod 77 at a particular instance, the described train of links and levers remains in the position shown in Fig. 13, wherein the spring 82 maintains the L-shaped lever 80 in a substantially vertical position. Under such conditions the toggle joint 95 remains relaxed with the free end of the cam track segment 74 held in the retracted position illustrated in broken lines in Figures 12 and 13 wherein it cannot engage the cam follower roller 73 of the filler valve that is aligned with the particular turret pocket passing underneath.

However, when a turret pocket contains a can, said can strikes against the arcuate feeler rod 77 and pushes said rod in radial direction out of its way causing the L-shaped arm 79 to swing outwardly away from the casting 21 against the force of the spring 82. In consequence thereof the radial arm 87 of the L-shaped link 86 swings downwardly and pulls the link 88 which causes the toggle-actuating link 93 to be pulled to the left as viewed in said Fig. 13. This tensions the toggle joint 95 causing its upper link 98 to swing the free end of the cam track segment 74 about its pivot 74a into the path of the control roller 73 of the corresponding filler valve 52. Thus, said roller and the nozzle 55 of said filling valve are briefly lifted which permits liquid to discharge from the interior of the reservoir 40 through the ports 59 into the can traveling in the turret pocket 47 directly below the particular filling valve; and as soon as said turret pocket with the can contained therein has passed the feeler rod 77, the spring 82 returns the L-shaped lever H and its associated linkage to their original positions wherein the toggle joint 95 is relaxed and the cam track segment 74 is retracted below the path of the rotating valve-control rollers 73.

By the described arrangement, the filling valves, comprised in the machine of the invention will open only in the presence of cans in the turret pockets underneath so that there is no danger that liquid from the rotating reservoir 40 may go to waste and soil the machine pedestal in case there is no can under any of the filling valves 52.

Means are provided in accordance with the invention which precisely predetermine the quantity of liquid discharged from the reservoir whenever a valve 52 is opened so that the amount of liquid directed into the cans passed through the machine of the invention is exactly the same for every one of said cans.

Figure 5:
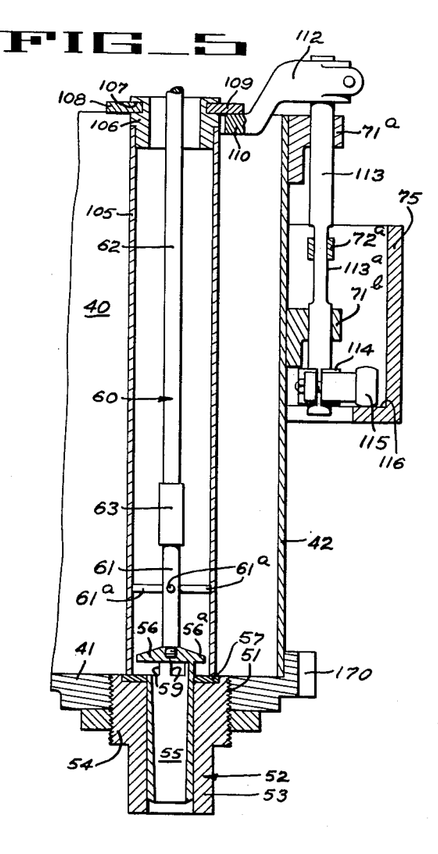
Figure 8:
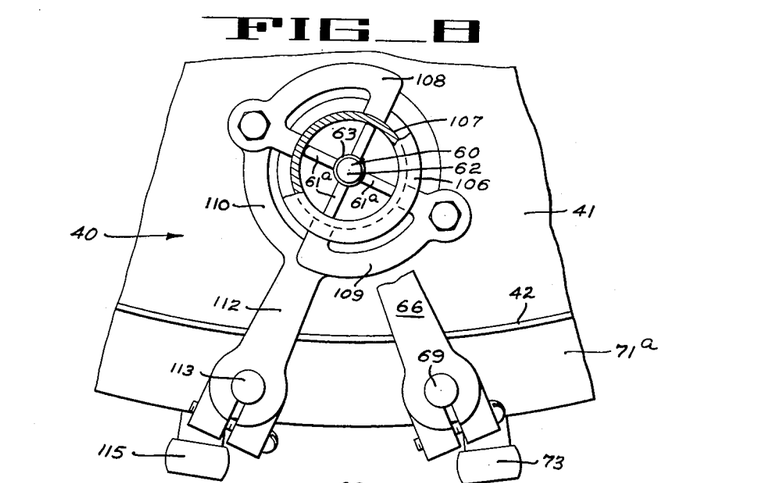
Fig. 8 is a fragmentary plan view illustrating details of the actuating mechanism for the measuring devices comprised in the machine of the invention.
Figure 9:
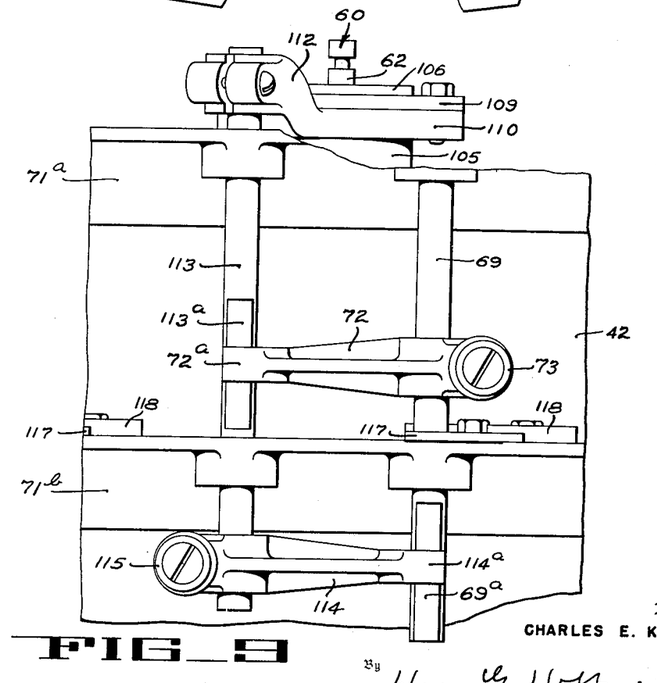
Fig. 9 is a fragmentary elevational view showing the mechanism illustrated in Figure 8 as viewed from the periphery of the machine.
Figures 10, 14:
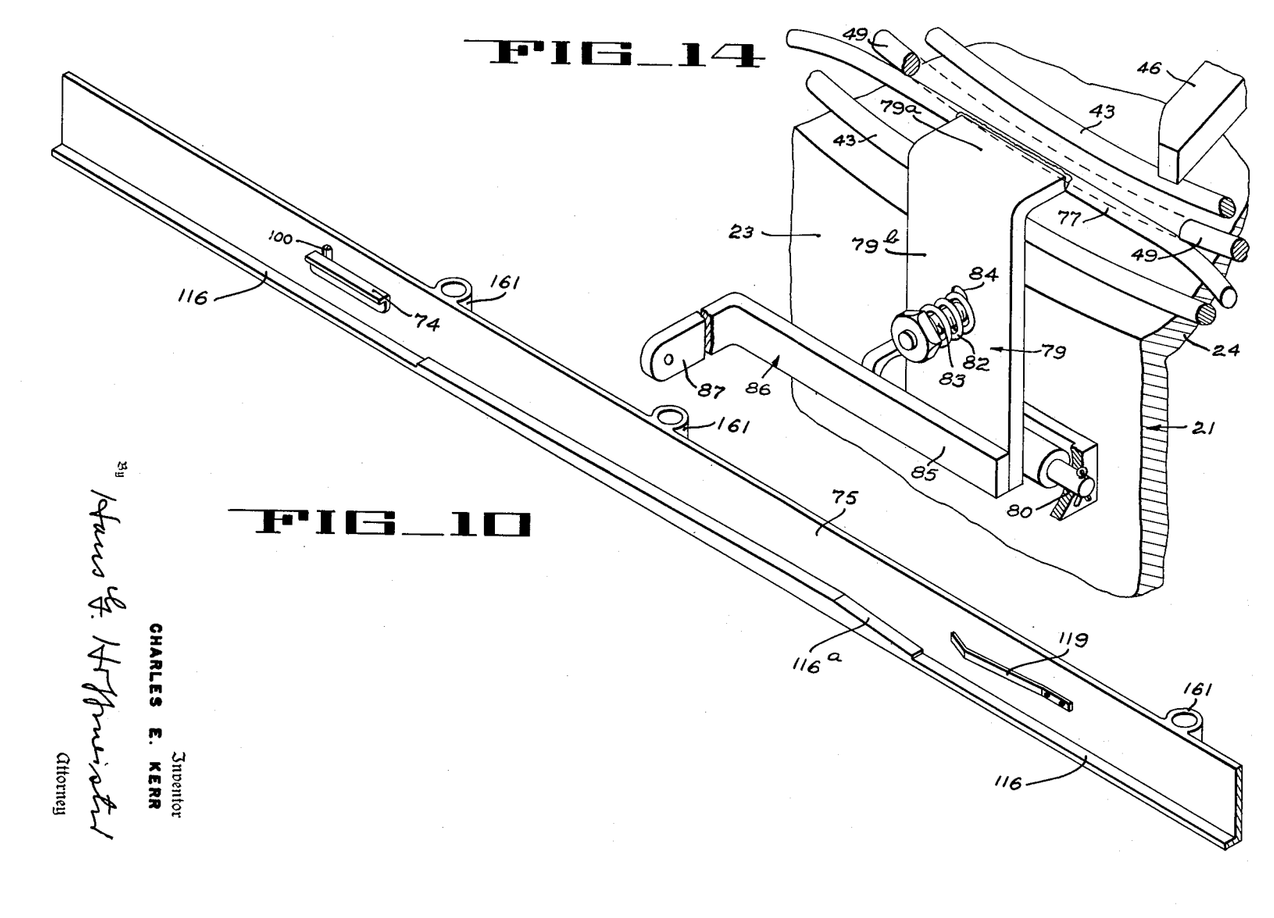
Fig. 10 shows the development of an annular band that surrounds the machine of the invention and carries plural cam tracks adapted to operate the actuating mechanisms for the filler valves and the measuring devices.
Fig. 14 is a perspective illustrating on an enlarged scale part of the control mechanism shown in Figure 13.

For this purpose a vertically movable hollow cylinder 105 of sufficiently large diameter to concentrically surround the lid member 56 of the valve nozzles 55 is placed above each of the filling valves 52 in axial alignment therewith so that its lower edge may rest upon the gasket 57 in the top surface of the bushing 53 and completely surrounds the lid portion 56 of the valve nozzle when the cylinder is in its lowermost position as illustrated in Figs. 3 and 5. Means are provided to lift each of the cylinders 105 a limited distance above the gasket 57 over part of their rotational course about the center axis of the machine to permit liquid to enter said cylinders from the reservoir 40 to a height determined by the liquid level within said reservoir whereupon each cylinder is lowered to its original position and held against its respective gasket 57 while its associated can filling valve 52 is opened in the above described manner, so that only the quantity of liquid entrapped within the cylinder may discharge through the valve nozzle 55 into the can below. Having again reference to Figs. 3, 4 and 5 four spokes 61a project radially from the lower section 61 of each valve stem 60 and bear against the inner surface of the cylinder 105 to maintain said cylinder in properly centered position relative to the valve 52 during its movement upwardly away from and back to the upper surface of the valve bushing 53. A collar 106 is fitted into the upper end of each of said cylinders and said collar is provided with an annular groove 107 which is engaged by the points of two opposed claws 108 and 109 that are bolted to the opposite ends of a yoke 110 which embraces said collar 106 as best shown in Figure 8. Said yoke 110 forms the end of an arm 112 that extends radially beyond the side wall 42 of the rotating reservoir 40 and which is firmly clamped to a vertical rod 113 that is slidably received within vertically aligned apertures of the aforementioned rings 71a and 71b which are secured to and rotate with the reservoir 40 (Figures 5 and 9). Clamped to each of the rods 113 below the lower ring 71b is a horizontal arm 114 disposed tangentially of the tank wall 42. Said arm may be arranged to embrace with its forked end 114a a flattened portion 69a of the rod 69 in the actuating mechanism of the associated filler valve 52, to be securely locked against accidental rotary displacement. Similarly the hereinbefore described arm 72 that is clamped to said rod 69 may engage with its forked end 72a a flattened portion 113a of the rod 113 (Figures 7, 9 and 14). Pivoted to each arm 114 is a cam follower roller 115 that rides upon a circular cam track 116 which is secured to the inside of the aforementioned stationary band 75 below the level of the cam track segment 74 (Figure 10). Over a sector of the band circumference exclusive of the sector occupied by said cam track segment 74 the cam track 116 exhibits a rise 116a of such height and duration as to lift the cam follower rollers 115 and hence the cylinders controlled by said rollers for a period of time and to an extent sufficient to permit liquid to flow from the reservoir 40 into the interior of the cylinders and fill them to the same level as the liquid level in the reservoir itself.

Figure 16:
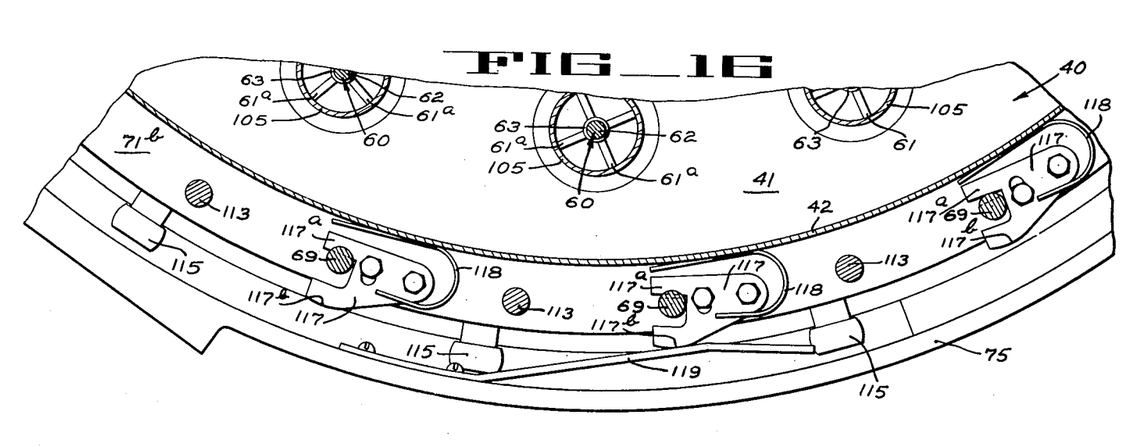
Fig. 16 is a plan view of a horizontal section through the mechanisms illustrated in Figure 15 taken along line 16—16 thereof.

Reverting to the described opening of the filling valves 52 by engagement of the cam follower rollers 73 with the cam track segment 74 in its elevated position, means are provided to retain each valve in its open position after its cam follower roller has passed the cam segment so as to allow all of the liquid entrapped in its associated measuring cylinder to escape into the cam underneath; and after discharge of the total amount of liquid within the measuring cylinder is assured, the actuating mechanism of each valve encounters means that disable said retaining means and effects closure of the valve prior to the hereinbefore described elevation of its respective measuring cylinder. Having reference to Figures 15 and 16 a latching blade 117 is pivoted to the lower ring 71b adjacent to each of the vertically slidable rods 69. The free end or tail 117a of each such blade is forked as shown and embraces its respective rod 69. Spring means 118 associated with each of the blades 117 urge them in counterclockwise direction as viewed in Figure 16 so that the inner prongs of their forked tails are pressed against the inner surfaces of their associated rods 69. At a level below the level of said blades 117 by a distance equal to the maximum elevation of the valve nozzle 55, the inner surfaces of the rods 69 exhibit horizontal slots 69b that are adapted to receive the inner prongs of the two-tailed blades 117. Thus, whenever a rod 69 is raised by engagement of its cam follower roller 73 with the cam track segment 74 in the manner described hereinbefore, the spring 118 forces the inner prong of its respective blade 117 into the slot 69b which latches the actuating rod 69 and the valve nozzle controlled thereby in elevated position. However, the outer edge of each of the two-tailed latching blades 117 is arranged to form a camming surface, as shown at 117b in Figure 16, and at a sector sufficiently far removed, in rotary direction, from the cam track segment 74 to allow for the time necessary for all the liquid contained in a measuring cylinder to drain off through the valve ports 59, the hereinbefore mentioned stationary band 75 carries a spring finger 119 (Figure 10) that forms a stationary camming surface which is adapted to engage the outer edges 117b of engaged latching blades and force said blades inwardly out of engagement with their respective rods 69. As a result thereof the actuating rods 69 may drop to their initial position in which their corresponding valves 52 are closed.

As has been indicated hereinbefore, the amount of liquid entrapped in each measuring cylinder 105 whenever such a cylinder is lifted in the described manner, and which is discharged from said cylinder into a can underneath whenever its associated filling valve 52 is opened, is dependent upon the liquid level in the reservoir 40. Therefore, to predetermine the amount of liquid to be filled into the containers processed in the machine of my invention, and to insure that exactly said predetermined amount be filled into everyone of the containers, means are provided in accordance with the invention that permit adjustment of the liquid level in the reservoir to exactly the desired height, and which maintain said level constant disregarding variations in the supply of the liquid to the reservoir 40 or irregularities in the withdrawal of liquid from the reservoir into the containers.

Having again reference to Fig. 3 a tank 120 of materially lesser depth than the hereinbefore described reservoir 40 is arranged concentrically within said reservoir. This inner tank 120 comprises a cylindrical shell 121 of sheet metal and a flat bottom 122 of cast iron that forms a bearing 123 in its center which loosely surrounds the rotating main shaft 25 of the machine. The shell 121 cooperates with the annular flange 41 and the wall 42 to define an annular trough above the filling valves 52. Said inner tank is adjustably supported at a predetermined level above the bottom 39 of the rotating outer tank or reservoir 40 by three vertical rods 124 which are secured to its floor 122 and protrude with their upper ends through open hubs 125 provided in a horizontal plate 126 that contains a bearing 126a in its center within which is rotatably received a reduced tenon 25a of the main shaft 25. Said plate 126 is suitably supported from the stationary machine pedestal in the center and slightly above the upper edge of the outer tank or reservoir 40 by means of a radially extending arm 127 that is held by a bracket 128 which rises from the aforementioned stationary band 75 (Figure 1). The upper portions of the rods 124 are threaded, as shown at 129, and screwed upon the projecting ends of said rods above the plate 126 are sprockets 130 which are operatively connected by a common chain 131 (Figure 2). One of said sprockets is provided with a hand wheel 132, as shown in Figures 1, 2 and 3, and by turning said hand wheel 132, all three sprockets 130 may be turned in unison to raise or lower the rods 124 and hence the inner tank 120 depending upon the direction in which the hand wheel 132 is turned. The supply of liquid to the described can filling machine is directed into the inner tank 120 through a spout 137 that may be supported, and protrude downwardly, from the aforementioned plate 126 (Figure 3). From the tank 120 a pump 138 provided in a suitable opening 139 in the bottom 122 of said tank pumps the liquid continuously into the lower portion of the outer tank 40. Said pump 138 consists of a helical vane 140 affixed to a vertical shaft 141 that may be suitably journaled in a bracket-like extension 142 of the tank bottom 122 and in the aforementioned top plate 126. A pulley 143 is slidably keyed upon the projecting upper end of said pump shaft 141 above the top plate 126 and is constantly driven by means of a belt 144 from an electric motor 145 that may suitably be supported from the repeatedly mentioned annular band 75 of the machine as shown in Figure 1. A heating coil 147 is mounted in the lower portion of the tank 121 by any suitable means. A heating medium such as steam may be circulated through the coil to maintain the liquid in the tank at a predetermined desirable temperature.

During practical performance of the machine the pump 138 is maintained in a continuous state of operation and thus delivers continuously liquid from the inner tank 120 into the annular trough in the lower portion of the outer tank 40 where it rises between the side walls 42 and 121 of said tanks until the liquid level within the outer tank reaches the upper edge of the inner tank and liquid flows over the said edge back into the inner tank. When the pump is operated sufficiently fast, therefore, the level of the liquid in the outer tank or reservoir 40 is solely determined by the weir formed by the upper edge of the inner tank, disregarding any temporary increase or decrease in the supply of the liquid to the machine through the spout 137 and irrespective of variations in the number of cans filled from the tank per time unit. Hence, since the measuring cylinders 105 operate within the outer tank beyond the confines of the inner tank, and since it is the level of liquid in said outer tank that determines the quantity of liquid entrapped in the measuring cylinders during operation of the machine as hereinbefore explained, the filling valves will deliver exactly the same amount of liquid into the containers passing through the machine, as long as the vertical position of the inner tank relative to the outer tank, remains unchanged. Vice-versa, the amount of liquid dispensed through every one of the filling valves 52, whenever said valves are opened in the presence of a can, may be conveniently adjusted to new values, if so desired, by the simple expedient of varying the vertical position of said inner tank relative to the outer tank. This is accomplished by turning the hand wheel 132 as described hereinbefore, and may be carried out while the machine remains in operation. In other words, whenever the hand wheel 132 is turned to lower the inner tank, the amount of liquid dispensed by each of the filler valves 52 during each cycle of the machine will be reduced, and vice versa, when the hand wheel is operated to raise the inner tank 40, the measured quantity of liquid dispensed from the valves 52 will be increased.

In order to adapt the described machine to cans of different height, means are provided to vary the vertical position of the main shaft 25 relative to the pedestal 20 of the machine as briefly pointed out hereinbefore. Whenever the vertical position of the shaft 25 is varied relative to the pedestal 20, the position of the outer tank 40 and hence the vertical position of the filling valves 52 provided in the horizontal flange portion 41 of said tank is varied relative to the can track 43 upon the horizontal flange 24 of the stationary casting 21. Hence, by varying the vertical position of the main shaft 25 the distance between the filler valves 52 and the can track 43 may be conveniently adjusted to suit the height of the particular types of cans that are to be processed in the described machine. Having again reference to Fig. 3 a vertical rack 150 is formed in the outer surface of the hereinbefore described sleeve 35 at the lower end of the main shaft 25, and in mesh with said rack is a pinion 151 secured to a horizontally disposed stub shaft 152. Said stub shaft turns in a bearing 153 formed in the above mentioned frame structure 37 which depends from the arms 30 of the spider 29. Secured to the free outer end of said stub shaft 132 is a worm gear 154 (Fig. 1) that meshes with a worm 155 carried by the lower end of an inclined operating shaft 156 whose upper end is provided with a hand wheel 157. By manipulating said hand wheel 157 the vertical position of the sleeve 35 and hence of the shaft 25 supported by said sleeve may be varied which in turn varies the vertical position of the outer tank 40 that is pinned to the shaft 25, and of the top plate 126 that rests upon said shaft. It will be understood that whenever the position of the outer tank is varied in the manner and for the purpose hereinbefore described, it is necessary that the vertical position of the stationary band 75 be varied accordingly, so as to maintain the relation between the cam follower rollers 73 and 115 and their cooperating cam tracks 74 and 116, respectively. For this purpose the two hereinbefore described posts 76 support said band 75 in such a manner that its vertical position relative to the machine pedestal may be varied, if desired. Having specific reference to Fig. 13 it will be noted that the upper end of each of said posts 76 is threaded, as shown at 160, and is loosely received within a loop 161 that is rigidly attached to the band 75 at the outer face thereof. Adjustment nuts 162 and 163 engage the threaded end of each post 76 above and below said loop 161 and by turning said nuts in one or the other direction the vertical position of the band 75 may be varied at will.

In practical performance the outer tank or reservoir 40 which carries the filling valves 52 and the measuring cylinders 105 is continuously rotated about the vertical center axis of the machine which may be accomplished in any suitable manner, such as by means of a drive gear (not shown) that is arranged to mesh with a ring gear 170 formed in the periphery of the horizontal flange 41 of the cup shaped tank bottom 39 (Figs. 1, 3 and 13). A continuous flow of the liquid to be dispensed by the machine is directed into the stationary inner tank through the spout 137, as previously pointed out, and the motor 145 is started to maintain the pump 138 in a continuous state of rotation which delivers the liquid into the cup shaped bottom 39 of the rotating tank from where it rises until its level reaches the upper edge of the stationary side wall 121 of the inner tank 120. From the moment the liquid in the outer tank has reached the described level cans may be passed through the machine because the level of liquid in the outer tank will from now on remain constant at the altitude determined by the upper edge of the inner tank, provided the pump 138 operates sufficiently fast to replace the liquid dispensed through the filler valves 52, for any excess of liquid delivered into the outer tank 40 by the pump 138 flows back into said inner tank over the upper edge thereof. Thus, every one of the measuring cylinders 105, when raised by engagement of its associated cam follower roller 115 with the rise 116a in the cam track 116, fills with a column of liquid of identical height which is entrapped within said cylinders as soon as return of their associated cam follower rollers 115 to the lower portion of the cam track 116 lowers them with their bottom edges into contact with the gasket 57 on the top surface of their respective valves 52. Hence, as long as the vertical position of the stationary tank 120 relative to the rotating tank 40 remains unchanged, the amount of liquid entrapped in the measuring cylinders will be the same for every one of said cylinders. Thus, as rotation of the outer tank 40 moves said cylinders 105 through the machine sector illustrated in Fig. 13 wherein the track segment 74 effects opening of their respective filler valves 52 in the manner and under the conditions previously described, exactly the same amount of liquid is delivered into every one of said cans irrespective of temporary variations in the supply of liquid to the machine or variations in the amount of liquid dispensed by the machine per time unit, such as may occur by irregularities in the continuity of the can procession passed through the machine. Very satisfactory performance has been obtained by arranging the raised segment 116a of the cam track 116 relative to the valve unlatching spring finger 119 in such a manner that each cylinder 105 is maintained in lowered position for at least 10 degrees of its rotary course, after its associated filling valve 52 has been closed, so as to allow ample time for the valve nozzle 55 to seat itself properly on the gasket 57 and thus prevent afterdrip through said valve. Thereafter, the raised segment 116a of the cam track 116 lifts the cylinders quickly to their maximum elevation of say ½" within no more than an arc of 20 degrees of their circular course, whereupon it forms a gradual downhill slope that is effective to close each cylinder progressively over about 140 degrees of their circular course. With a cam track 116 constructed in the described manner surging was held at a minimum with the result that the liquid column formed within the cylinders rose always to very precisely the same level as the liquid level in the surrounding tank. Moreover, the described conformation of the cylinder control cam 116 provides for a period of about 160° of the total operational cycle of the machine for operating the filling valves 52 so that each filling valve may readily be kept open for a sufficient period of time to allow the entire liquid column entrapped in its associated cylinder to escape.

While I have explained my invention with the aid of a particular embodiment thereof, it will be understood that I do not wish to be limited to the specific constructional details shown and described which may be departed from without departing from the scope and spirit of the invention.

I claim:

1. A fluid dispensing machine comprising a first tank, a second tank of smaller depth arranged within said first tank with its upper edge disposed below the upper edge of said first tank, means operable to deliver fluid into said second tank and maintain the fluid at a fixed level therein, means operable to effect flow of fluid from said second into said first tank, a discharge valve provided in said first tank at a level below the upper edge of said second tank, and a metering member movable within the space between said tanks from a position removed from said valve to a position wherein it separates said valve from the space between said tanks to segregate a quantity of fluid, said metering member being of a height to extend above the level of fluid in said second tank, and having an open unobstructed interior chamber permitting fluid flowing thereinto to assume the level of the fluid in said second tank.

2. A can filling machine comprising a reservoir having bottom and said side walls, means for maintaining liquid at a desired level in said reservoir, a metering member mounted in said reservoir, said member being of a height greater than the height of liquid in said reservoir and having a lower open-ended portion movable into sealing engagement with the bottom wall of said reservoir to segregate a quantity of liquid, said metering member having an open unobstructed interior chamber permitting the liquid flowing thereinto to assume the level of liquid in said reservoir, and means operable to discharge from said reservoir the quantity of liquid segregated by said metering member.

3. A can filling machine comprising a reservoir, adjustable means effective to maintain the level of liquid in said reservoir at a predetermined level, a metering member mounted in said reservoir, said member being of a height greater than the height of liquid in said reservoir and having a lower open-ended portion movable into sealing engagement with the bottom wall of said reservoir to segregate a quantity of liquid, said material member having an open unobstructed interior chamber permitting the liquid flowing thereinto to assume the level of liquid in said reservoir, and means operated in timed relation with said metering member to discharge the segregated quantity of liquid from said reservoir.

4. A liquid dispensing machine comprising a first tank, a second tank disposed within said first tank with the upper edge of the second tank disposed below the upper edge of the first tank and the space between the tanks defining a reservoir, a plurality of normally closed discharge valves provided in said first tank near the lower end thereof, a plurality of metering members mounted within said reservoir, each member being associated with one of said valves and having a portion movable from a first position wherein the space immediately above said valve is in flow communication with said reservoir to a second position wherein the space above the valve is out of flow communication with said reservoir, means for moving the movable portion of each metering member to said second position to segregate a charge of liquid above the associated valve, means for opening said associated valve to discharge the segregated charge of liquid, means for closing said associated valve, means for moving said movable portion of each metering member to said first position to reestablish flow communication between the space above the associated valve and said reservoir, and means operable to effect flow of liquid from said second into said first tank in quantities sufficient to cause continuous overflow into said second tank.

5. A fluid dispensing machine comprising a first tank, a second tank of less depth than said first tank and disposed within said first tank, means operable to effect flow of liquid from said second into said first tank in quantities sufficient to cause overflow into said second tank, a valve provided in said first tank, a measuring vessel associated with said valve, means operable to alternately establish and shut off communication between the interior of said vessel and the space between said tanks, means operable to close said valve when the interior of said vessel is in communication with the space between said tanks and to open said valve when the interior of said vessel is separated from the space between said tanks, and means operable to bodily shift the vertical position of said second tank relative to said first tank to adjust the upper edge of said second tank and vary the liquid level in said first tank.

6. A fluid dispensing machine comprising a first tank, a second tank arranged within said first tank with its upper edge disposed below the upper edge of said first tank, means operable to effect flow of fluid from said second into said first tank, means operable to maintain fluid in said second tank at a predetermined level, a normally closed valve provided in a bottom portion of said first tank, an open-ended hollow cylinder disposed within the space between said first and second tanks in axial alignment with said valve and projecting with its upper end above the upper edge of said second tank, means operable to reciprocate said cylinder between a raised position with its lower end spaced from said valve and a lowered position wherein it surrounds and separates said valve from the space between said tanks and segregates a charge of fluid the quantity of which is dependent on the level of fluid in said second tank, and means operable to temporarily open said valve when said cylinder is in said lowered position.

7. A can filling machine comprising a can track, a first tank having a discharge opening situated above said track, a second tank arranged within said first tank with its upper edge disposed below the upper edge of said first tank, continuously operating means for delivering liquid into said second tank, pump means operable to effect continuous flow of liquid from said second into said first tank, an enclosure associated with said discharge opening and located within the space between said tanks, cyclically operable means to place said enclosure into and out of a condition wherein it separates said discharge opening from the space between said tanks and segregates a charge of liquid, and means operable in timed relation with said cyclically operable means to open said discharge opening when it is not in communication with the space between said tanks to discharge said segregated charge, said pump means being arranged to continuously deliver liquid to said first tank in quantities sufficient to force liquid over the upper edge of said second tank and into said second tank as liquid is discharged through said opening.

8. A can filling machine comprising a can track, a first tank having a bottom portion situated above said track, a normally closed discharge valve provided in said bottom portion, a second tank disposed within said first tank, means for delivering fluid into said second tank, means effecting flow of fluid from said second into said first tank, a hollow open-ended cylinder arranged coaxially with said valve in the space between said tanks, said cylinder being of such length as to project above the upper edge of said second tank, cyclically operable means to reciprocate said cylinder between a raised position wherein its lower edge is located above said bottom portion and a lowered position wherein its lower edge is in contact with said bottom portion separating said valve from the space between said tanks, and means operating in timed relation with said cyclically operable means to open said valve temporarily when said cylinder is in its lowered position.

9. A can filling machine comprising a circular can track, a first tank arranged concentrically with and having an annular bottom portion situated above said can track, a normally closed discharge valve provided in said annular bottom portion, a second tank disposed within said first tank, means for delivering liquid into said second tank, means effecting flow of liquid from said second into said first tank, a hollow open-ended cylinder supported from said outer tank co-axially with said valve in the space between said first and second tanks, means operable to turn said outer tank with said valve and said cylinder about its vertical center axis, means operable to move a can on and along said track in vertical alignment with said valve, means operable to continuously actuate said liquid flow effeceting means, means operated by rotation of said first tank to reciprocate said cylinder between a raised position wherein its lower edge is situated above the circular bottom portion of said first tank and a lowered position wherein its bottom edge is in contact with said annular bottom portion separating said valve from the space between said tanks, and means operated by rotation of said first tank to open said valve temporarily when said cylinder is in its lowered position.

10. A can filling machine comprising a circular can track, a first tank arranged concentrically with and having an annular bottom portion situated above said can track, a normally closed discharge valve provided in said annular bottom portion, a second tank arranged within said first tank with its upper edge disposed below the upper edge of said first tank, means for delivering liquid into said second tank, means operable to effect flow of liquid from said second into said first tank, a hollow open-ended cylinder of a length at least as great as the distance between the annular bottom portion of said first tank and the upper edge of said second tank supported from said first tank co-axially with said valve in the space between said first and second tanks, means operable to turn said outer tank with said valve and said cylinder about its vertical center axis, means including said outer tank to move a can on and along said track in vertical alignment with said valve, means operable to continuously actuate said liquid flow effecting means, means operated by rotation of said first tank to raise said cylinder temporarily from a lowered position wherein its bottom edge is in contact with the annular bottom portion of said first tank, and means operated by rotation of said first tank to open said valve temporarily while said cylinder is in said lowered position.

11. Arrangement according to claim 10 wherein said cylinder-raising means are arranged to raise said cylinder rapidly to its maximum elevation and thereafter return it gradually to its lowered position.

12. In a liquid dispensing machine, a liquid supply tank having an upper overflow edge, a plurality of valves arranged to discharge liquid from said supply tank, means for intermittently actuating said valves to discharge liquid from said tank, and means for supplying liquid to said tank in quantities sufficient to force liquid to flow over the upper edge of said tank while liquid is discharged through said valves.

13. A fluid dispensing machine comprising a first tank, having a side wall and a bottom wall, a second tank of smaller depth arranged within said first tank and cooperating with the side wall and the bottom wall of said first tank to define an annular trough, said second tank having an upper edge disposed below the upper edge of said first tank permitting excess fluid from said annular trough to flow into said second tank, a plurality of valves disposed in said annular trough and arranged to control the flow of liquid therefrom, means for actuating said valves to discharge fluid from said trough, and means for supplying liquid to said trough in quantities sufficient to force fluid to overflow into said second tank as said valves are actuated to discharge fluid from said trough.

14. In a liquid dispensing machine, the combination of a reservoir having side walls and a bottom wall, means for maintaining liquid in said reservoir at a predetermined level, and a cylindrical measuring member movable into liquid-tight engagement wth the bottom wall of said reservoir to enclose a charge of liquid the quantity of which is dependent on the level of liquid in said reservoir.

15. In a liquid dispensing machine, the combination of a liquid reservoir having side walls and a bottom wall, means for maintaining liquid in said reservoir at a predetermined level, a discharge valve in said bottom wall, a cylindrical measuring member movable into liquid-tight engagement with said bottom wall around said valve to enclose a charge of liquid the quantity of which is dependent on the level of liquid in said reservoir, and means for actuating said valve to discharge said enclosed charge of liquid.

16. A can filling machine comprising a can track, a first tank having a bottom portion situated above said track, a normally closed discharge valve provided in said bottom portion, a second tank disposed within said first tank, means for delivering fluid into said second tank, means effecting flow of fluid from said second into said first tank, a measuring member having a cylindrical portion arranged coaxially with said valve in the space between said tanks, said measuring member being of such length as to project above the upper edge of said second tank, cyclically operable means to reciprocate said measuring member between a raised position wherein its lower edge is located above said bottom portion and a lowered position wherein its lower edge is in contact with said bottom portion separating said valve from the space between said tanks, and means operating in timed relation with said cyclically operable means to open said valve temporarily when said measuring member is in its lowered position.

17. A can filling machine comprising a circular can track, a first tank arranged concentrically with and having an annular bottom portion situated above said can track, a normally closed discharge valve provided in said annular bottom portion, second tank disposed within said first tank, means for delivering liquid into said second tank, means effecting flow of liquid from said second into said first tank, a measuring member supported in said outer tank having a generally cylindrical portion disposed coaxially with said valve in the space between said first and second tanks, means operable to turn said outer tank with said valve and said cylinder about its vertical center axis, means operable to move a can on and along said track in vertical alignment with said valve, means operable to continuously actuate said liquid flow effecting means, means operated by rotation of said first tank to reciprocate said measuring member between a raised position wherein its lower edge is situated above the annular bottom portion of said first tank and a lowered position wherein its bottom edge is in contact with said annular bottom portion separating said valve from the space between said tanks, and means operated by rotation of said first tank to open said valve temporarily when said measuring member is in its lowered position.

18. In a liquid dispensing machine, the combination of a first tank having a central sump and an annular floor portion surrounding said sump at a higher elevation than said sump, a second tank disposed in the sump of said first tank having a peripheral wall with an upper portion disposed above the level of said floor portion, means for pumping liquid from said second tank into said sump and upwardly between the wall of said second tank and the wall of said sump into the annular space between the wall of said first tank and the upper wall portion of said second tank, and a plurality of discharge valves disposed in said annular floor portion.

19. In a liquid dispensing machine the combination of a first tank mounted for rotation on a vertical axis, a stationary second tank of less depth than said first tank and disposed inside said first tank to define a chamber around said second tank between the walls of said tanks, means for pumping liquid downwardly out of said second tank and directing it upwardly in said chamber, means for bodily raising and lowering said second tank relative to said first tank, and means for rotating said first tank relative to said second tank.

20. In a liquid dispensing machine, the combination of a first tank having upstanding side walls and a bottom wall, a second tank of less depth than said first tank and disposed within said first tank, pump means operable to effect flow of liquid from said second tank into said first tank in quantities sufficient to cause overflow into said second tank, a plurality of discharge valves in the bottom wall of said first tank, means associated with each discharge valve for segregating a quantity of liquid, and means for actuating each discharge valve to discharge the segregated charge.

21. In a liquid dispensing machine, the combination of a first tank having upstanding side walls and a bottom wall, a second tank disposed in said first tank and having a peripheral wall spaced from the side wall of said first tank to provide a reservoir for liquid between said walls, means for pumping liquid from said second tank into said reservoir, and a plurality of discharge valves disposed in the bottom wall of said first tank for discharging quantities of liquid from said reservoir.

References Cited in the file of this patent
UNITED STATES PATENTS

| | | |
|---|---|---|
| 1,025,814 | Lemp | May 7, 1912 |
| 1,036,778 | Baker | Aug. 27, 1912 |
| 1,105,173 | Baker | July 28, 1914 |
| 1,483,861 | Heulings | Feb. 12, 1924 |
| 1,512,764 | Holmquist | Oct. 21, 1924 |
| 1,513,882 | Bateman | Nov. 4, 1924 |
| 1,519,756 | Colbert | Dec. 16, 1924 |
| 1,683,120 | Ayars | Sept. 4, 1928 |
| 1,946,025 | Lewis | Feb. 6, 1934 |
| 2,122,705 | Welborn | July 5, 1938 |
| 2,222,617 | Hothersall et al. | Nov. 26, 1940 |
| 2,321,994 | Chapman | June 15, 1943 |
| 2,356,176 | Pechy | Aug. 22, 1944 |
| 2,363,543 | De Haven Miller | Nov. 28, 1944 |
| 2,374,268 | Bingham | Apr. 24, 1945 |
| 2,466,731 | Nordquist | Apr. 12, 1949 |